United States Patent [19]

Gurian

[11] 4,269,716
[45] May 26, 1981

[54] ION EXCHANGE SEPARATION METHOD

[75] Inventor: Marshall I. Gurian, Tempe, Ariz.

[73] Assignee: Advanced Systems, Inc., Phoenix, Ariz.

[21] Appl. No.: 115,939

[22] Filed: Jan. 28, 1980

[51] Int. Cl.³ .............................................. B01J 47/10
[52] U.S. Cl. ..................................... 210/675; 210/688
[58] Field of Search ..................... 210/33, 38 R, 38 B, 210/675, 676, 688

[56] References Cited
U.S. PATENT DOCUMENTS 3,130,151  4/1964  Levendusky ........................ 210/33
3,515,277  6/1970  Kingsbury et al. ..................... 210/33
3,607,740  9/1971  Akeroyd ................................ 210/33

Primary Examiner—Ivars C. Cintins
Attorney, Agent, or Firm—Drummond & Nelson

[57] ABSTRACT

An improved ion exchange separation method in which the volume of spent wash liquid and treated feed liquid is reduced by withdrawing a slurry of regenerated resin and wash water from the regeneration column and introducing the slurry into the bottom of the main treating column. The wash liquid is withdrawn from the main treating column along with the de-ionized feed liquid.

1 Claim, 1 Drawing Figure

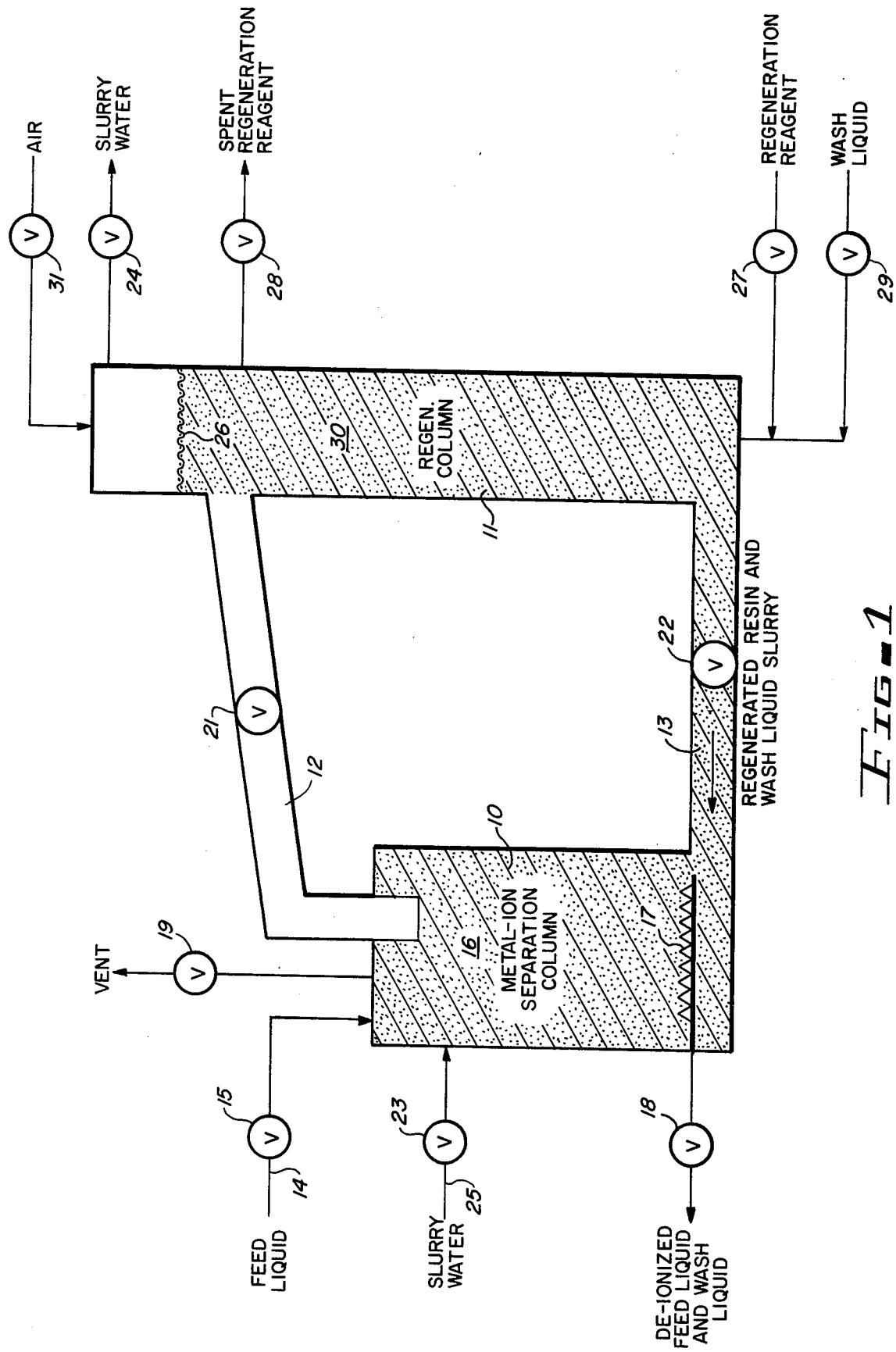

ION EXCHANGE SEPARATION METHOD

This invention relates to moving-bed ion exchange separation techniques for selectively separating metal ions from a feed liquid.

In another respect, the invention pertains to an ion exchange separation method in which the volumes of the treated feed liquid and wash water from the resin regeneration step are minimized.

In still another aspect, the invention relates to an ion exchange separation method in which the processing steps and equipment are greatly simplified in comparison with typical prior art ion exchange separation methods.

In still another aspect, the invention concerns methods for removing metal ion contaminants from process rinse waters such as, for example, waste waters produced as by-products in electroless metal deposition processes and the rinse waters produced as by-products of copper etching processes.

As a result of govermental efforts to reduce environmental pollution, it has recently become increasingly important to treat waste solutions which are by-products of various chemical processes to reduce the concentration of and/or eliminate various metal ions in these waste waters.

Conventional ion exchange techniques have been effectively employed for this purpose. Such conventional techniques generally involve contacting the contaminated feed liquid with a granular ion exchange resin to selectively sorb certain of the metal ion contaminants onto the resin. Periodically, when the ion exchange resin has become "loaded" with sorbed contaminant metal ions, the loaded resin is regenerated by treating it with a chemical regenerating reagent which causes desorbtion of the contaminant metal ions and restores the ion exchange resin to a substantially contaminant-free condition for contact with additional contaminated feed liquid. These techniques have evolved into a cyclical process in which the bed of ion exchange resin is physically moved from the main treating vessel to a regeneration vessel where the loaded resin is first contacted with the regenerating reagent and then washed and/or given further chemical conditioning treatments and the regenerated resin is then physically moved back to the main treatment vessel for further removal of contaminant ions from the feed liquid.

Although such moving bed ion exchange techniques are very effective in reducing the level of contamination of the feed liquid, the prior art processes have, in varying degree, suffered a subsidiary disadvantage in that the ion exchange process and the regeneration process both produce substantial quantities of solutions containing the contaminant metals which, themselves, present disposal problems.

For example, in a printed circuit manufacturing facility, several solutions are produced which offer special problems, the etchant solutions, the electroless solutions and rinse waters. These solutions grow in solution volume and the excess volume must be treated and either reclaimed or disposed of. In the case of the etchant, the concentration, value and ease of recovering copper usually makes it economical to recover the copper contaminant, even if the etchant has to be transported to a central location. However, the value of the copper in the rinse waters is insignificant in comparison with recovery costs, but very significant from the standpoint of the environmental pollution. Furthermore, the complexing agents present in electroless copper and other baths usually prevent the precipitation and removal of heavy metals and, therefore, they must be removed before the waste solution is sent to a treatment plant.

Other similar examples of waste solutions from various chemical and electrochemical processing facilities will readily occur to those skilled in the art which are amenable to treatment according to the invention herein disclosed. In addition to treatment of pretreatment of waste liquids to remove contaminant metal ions, the process of the present invention may also be effectively employed to separate product metal values from their solutions in primary and secondary metal product industries, even though the metal values, themselves, do not constitute significant environmental pollution hazards.

While a great deal of work has been done to improve the efficiency with which moving-bed ion exchange resin processes selectively separate metal ions from solutions thereof, little effort has been directed to reducing the secondary waste by-products of the separation processes, namely, the spent regenerate and wash liquids which, themselves, contain even higher concentrations of the contaminant metal. The resent invention is directed to a process in which the wash liquids from a moving-bed ion exchange resin metal separation process are reduced and leave the process as a part of the treated primary feed and is based on the discovery that the chemical characteristics of the wash liquid are, in many instances, completely compatible with the treated feed liquid, both from the standpoint of avoiding undesirable reactions between the treated feed liquid and the wash liquid and from a standpoint of their mutual disposability. Thus, in accordance with the process, a significant reduction is made in the total volume of waste solutions which are, themselves, produced as by-products of the moving-bed ion exchange metal separation process, as only the spent reagent presents any further disposal problem.

Accordingly, it is an object of the present invention to provide an improved ion exchange resin metal separation process.

Another object of the invention is to provide such a process which produces a reduced quantity of by-product waste solution which presents any disposal problem.

Yet another object of the invention is to provide a moving-bed ion exchange metal separation technique specially adapted to the treatment of waste solutions from various metal deposition and etching processes.

Still another object of the invention is to provide such a process which functions in a simplified manner and which provides an economically attractive alternate to present waste water purification processes.

These and other, further and more specific objects and advantages of the invention will be apparent to those skilled in the art from the following detailed description thereof, taken in conjunction with the drawing, in which:

FIG. 1 is a simplified flowsheet illustrating the practice of the presently preferred embodiment of the invention.

Briefly, in accordance with the invention, I have discovered an improved moving-bed ion exchange separation method for separating metal ions from a feed liquid. The method of the invention constitutes an improvement on conventional prior art techniques, which prior art techniques include the steps of contacting the feed liquid in a separating zone with a granular ion exchange resin to sorb the metal ions onto the resin, withdrawing the feed liquid substantially free of said ions from the separation zone, withdrawing ion exchange resin loaded with the metal ions from the separation zone, treating the loaded resin in a separate regeneration zone with a regeneration reagent liquid to desorb the metal ions from the resin, withdrawing the spent regeneration reagent liquid from the regeneration zone, washing the regenerated ion exchange resin in the regeneration zone with a wash liquid and recycling the regenerated reagent to the separation zone for contact with additional feed liquid.

The improvement which I provide results in a reduction in the volume of spent wash liquid and comprises the steps of introducing the feed liquid into the top portion of the separating zone for downflow contact with the regenerated ion exchange resin, introducing the regeneration reagent liquid into the lower portion of the regeneration zone for upflow and regenerating contact with a quantity of the loaded ion exchange resin. Periodically, the flow of regeneration reagent is interrupted and wash liquid is introduced into the lower portion of the regeneration zone to wash the regenerated resin and displace the regeneration reagent liquid upwardly. After washing, at least a portion of the washed resin and wash liquid are withdrawn from the lower portion of the regeneration zone and introduced into the lower portion of the separation zone. Thereafter, loaded ion exchange resin is withdrawn from the top of the separation zone and introduced into the top of the regeneration zone. During the next feed liquid treatment cycle, the de-ionized feed liquid and the wash liquid are withdrawn for the lower portion of the separation zone for disposal or other treatment. Thus, the processing method of the present invention is to be clearly distinguished from prior art moving-bed ion exchange resin processes in which the wash liquid forms a separate stream of waste material which must be handled separately for disposal. Also, by utilizing the wash liquid to expand the washed regenerated resin, movement of a portion of the resin bed in the regeneration column into the primary metal separation column is facilitated as movement of only a portion of the resin from the regenerating column by fluid pressure and returning the loaded resin from the top of the main separating zone to the regeneration column by means other than hydraulic ram pressure overcomes significant practical operating problems of the prior art.

The drawing (FIG. 1) schematically illustrates a system which is useful in the practice of the steps of the present invention. The system comprises a metal ion separation column 10 and a resin regeneration column 11 connected by resin transfer conduits 12 and 13. In operation, the feed liquid 14 under pressure passes through valve 15 and is forced downwardly through the ion exchange resin bed 16. The feed liquid is contacted with the ion exchange resin 16 which selectively sorbs the metal ions from the feed liquid 14 and "exchanges" a suitable cation such as sodium, ammonia or hydrogen, which passes into solution in the feed liquid. The de-ionized feed liquid is collected by a separator and passes out of the metal ion separation column 10 through valve 18.

Regeneration of the bed 30 in the regeneration column 11 is accomplished by closing transfer valve 21 and 22 and the slurry water outlet valve 24 and opening the regeneration reagent inlet valve 27 and the spent regeneration reagent valve 28. The regeneration reagent is admitted through valve 27 under pressure into the bottom of the regeneration column 11 and flows upwardly through the bed 30, stripping the metal ion contaminants from the resin and displacing slurry water from the top of the regeneration column 11 through valve 24. After the slurry water is displaced, the spent regeneration reagent flows out of the regeneration column 11 through valve 28.

When the resin in the bed 30 has been regenerated to the desired extent, the regeneration reagent inlet valve 27 is closed and wash liquid under pressure is admitted to the bottom of the regeneration column 11 through valve 29. The wash liquid may simply be water which washes traces of the regeneration reagent off the resin beads or it may include chemicals which further condition the regenerated reagent in the bed 30. As the wash liquid flows through valve 29 and upwardly through the resin bed 30, spent regeneration reagent is displaced upwardly through the bed and exits the regeneration column 11 through valve 28. This column of wash liquid remains in the interstices of the regenerated resin beads forming the bed 30.

The regenerated ion exchange resin is transferred from the regeneration column 11 to the metal ion separation column 10 by closing the resin transfer valve 21 and opening the resin transfer valve 22 and vent valve 19. Air under pressure is admitted through valve 31 into the top of the regeneration column 11 and the pressurized air forces the bed 30 downwardly such that the bottom portion of the bed 30 passes out of the regeneration column through the transfer valve 22 and into the bottom of the metal ion separation column 16.

During this portion of the operation of the system of FIG. 1, resin transfer valves 21 and 22 are closed. Small portions of the loaded resin are periodically removed from the metal ion separation column 16 by closing the valves 15 and 18 and opening the slurry water inlet valve 23, the loaded resin transfer valve 21 and the slurry water outlet valve 24. All other valves in the system are closed. Slurry water 25 or feed liquid 14 admitted under pressure through valves 23 or 15 suspends the resin beads located in the upper part of the resin bed 16 and the resultant suspension flows through loaded resin transfer line 12 into the upper portion of the regeneration column 11. The slurry water passes upwardly through the screen 26 and passes out of the regeneration column through the valve 24. The loaded resin is retained under the screen 26 in the top portion of the regeneration column 11 forming a column 30 of resin beads therewithin.

As previously noted, only relatively small portions of the resin bed 30 are transferred at any one time into the metal ion separation column 10 and correspondingly small portions of the loaded resin from the bed 16 are slurried and transferred to the upper portion of the regeneration column. In this fashion, the static and frictional forces which are encountered in moving regenerated resin from the bed 30 to the bed 16 are minimized in comparison with conventional prior art processes in which all resin movements are effected by hydraulic pressure rather than by the combination of hydraulic pressure and slurrying techniques herein described.

To further illustrate the invention and the practice of the presently preferred embodiments thereof to those skilled in the art, the following working example is presented.

EXAMPLE

A feed stream consisting of the effluent from an ammoniacal copper etchant rinse, having a copper content of 20–40 mg/l in the form of a copper ammonia complex and having a pH of 8.5 is treated according to the method described above in apparatus as described in FIG. 1. The feed stream contained other contaminants in the form of ammonium chloride and ammonium hydroxide. The resin employed was a weak-acid, macroporous class ion exchange resin formed of cross-linked polyacrylic acid-based polymer having carboxylic acid functional groups. The resin bed in the primary separation column was 8" in diameter and 30" deep and resin bed in the regeneration column was 3" in diameter and 40" deep. The resin volume shifted per cycle was 1.4 liters and the resin shift frequency was 40 minutes.

The regeneration reagent was an aqueous solution of ammonium chloride (240 g/l) and ammonium hydroxide (200 g/l). The wash solution was ammonium hydroxide 26° Be) and was used at the rate of 1 per cycle.

The following process cycle was used to treat the feed water stream:

(1) Resin shift—resin shifted from regeneration column to primary separation column by air pressure, followed by transfer of equivalent volume of resin from primary column to regeneration column by slurrying resin with feed water.

(2) Feed water treatment cycle—17 minutes, with regeneration column inactive.

(3) Regeneration cycle—2 minutes with introduction of regenerant to regeneration column at 500 ml/min. The output from the regeneration column in this step is the feed water used to transport resin from the primary column to the regeneration column in step 1. This feed water was diverted back to the feed water system.

(4) Feed water treatment cycle—17 minutes, with regeneration column inactive to allow resin-regeneration reagent contact time sufficient for good chemical transfer.

(5) Regeneration cycle—2 minutes, with regeneration reagent at 500 ml/min. introduced to regeneration column. The regeneration column output is spent regeneration reagent which is stored in spent etchant drum.

(6) Rinse cycle—2 minutes, with rinse at 500 ml/min. Output spent reagent stored in spent etchant drum.

(7) Repeat steps 1–6.

The ammonia rinse displaced the copper-containing regeneration solution and the absence of chloride ions in the ammonia solution minimized the further copper contamination of the wash liquid which was shifted into the primary separation column during the resin shift cycle.

The resultant effluent stream from the primary separation column had a nominal copper content of 0.3–0.5 mg/l with a spike of about 2–3 mg/l occurring immediately after the resin shift and of about 3 minutes duration. The spent regenerant by-product had a copper concentration of 10–15 g/l.

Having described my invention in such terms as to enable those skilled in the art to understand and practice it, and having identified the presently preferred embodiments thereof, I claim:

1. In a moving-bed ion exchange separation method for selectively separating metal ions from a feed liquid, including the steps of contacting said feed liquid in a separating zone with granular ion exchange resin to sorb said metal ions onto said resin, withdrawing said feed liquid substantially free of said ions from said separation zone, withdrawing ion exchange resin loaded with said metal ions from said separation zone, treating said loaded resin in a regeneration zone with a regeneration reagent liquid to desorb said ions from said resin, withdrawing spent regeneration reagent liquid from said regeneration zone, washing the regenerated ion exchange resin in said regeneration zone with a wash liquid, and recycling said regenerated resin to said separation zone for contact with additional feed liquid, the improvement in said method whereby the volume of spent wash liquid and treated feed liquid is reduced, said method comprising the steps of:

(a) introducing said feed liquid into the top portion of said separating zone for downflow therewithin and contact with said ion exchange resin;

(b) introducing said regeneration reagent liquid into the lower portion of said regeneration zone for flow upwardly therethrough and regenerating contact with a quantity of said loaded granular ion exchange resin therewithin;

(c) interrupting the flow of said regeneration reagent liquid through said regeneration zone;

(d) introducing said wash liquid into the lower portion of said regeneration zone to wash regenerated resin and to displace said regeneration reagent liquid upwardly therewithin;

(e) withdrawing at least a portion of said regenerated resin and wash liquid from the lower portion of said regeneration zone;

(f) introducing said withdrawn regenerated resin and wash liquid into the lower portion of said separation zone;

(g) withdrawing loaded ion exchange resin from the top of said separation zone and introducing said withdrawn loaded resin into the top of said regeneration zone; and (h) withdrawing de-ionized feed liquid and wash liquid from the lower portion of said separation zone.

* * * * *